United States Patent
Shoji et al.

(10) Patent No.: US 6,361,882 B1
(45) Date of Patent: Mar. 26, 2002

(54) HIGH-STRENGTH ALUMINUM ALLOY CLAD MATERIAL FOR HEAT EXCHANGERS EXHIBITING EXCELLENT CORROSION RESISTANCE

(75) Inventors: Yoshifusa Shoji; Kohichi Maeda; Toshihiko Fukuda, all of Nagoya (JP)

(73) Assignee: Sumitomo Light Metal Industries, Ltd., Tokyo (JP)

( * ) Notice: Subject to any disclaimer, the term of this patent is extended or adjusted under 35 U.S.C. 154(b) by 0 days.

(21) Appl. No.: 09/703,224

(22) Filed: Oct. 31, 2000

(51) Int. Cl.[7] .............................................. B32B 15/20
(52) U.S. Cl. ...................... 428/654; 165/180; 428/686; 428/933
(58) Field of Search .................................. 428/654, 686, 428/933; 420/529, 533, 534, 535, 538, 548, 549, 553; 148/416, 417, 438, 439; 165/180

(56) References Cited

U.S. PATENT DOCUMENTS 5,292,595 A * 3/1994 Yamauchi et al. .......... 428/654

* cited by examiner

Primary Examiner—Robert R. Koehler
(74) Attorney, Agent, or Firm—Flynn, Thiel, Boutell & Tanis, P.C.

(57) ABSTRACT

A high-strength aluminum alloy clad material for heat exchangers which excels in corrosion resistance and formability before brazing and has improved strength after brazing. The aluminum alloy clad material is made up of a core material and a brazing material, with one or both sides of the core material clad with the brazing material. The core material is made up of an aluminum alloy containing from 0.3% to less than 0.6% of Mn, from more than 0.6% to 1.0% of Cu, less than 0.1% of Si, 0.3% or less of Fe, and from 0.06% to 0.35% of Ti, with the remainder being Al and impurities; and the brazing material used to clad the core material is made up of an Al—Si aluminum alloy in which the Ca content is limited to 0.006% or less.

11 Claims, 2 Drawing Sheets

HIGH-STRENGTH ALUMINUM ALLOY CLAD MATERIAL FOR HEAT EXCHANGERS EXHIBITING EXCELLENT CORROSION RESISTANCE

BACKGROUND OF THE INVENTION

1. Field of the Invention

The present invention relate s to a high-strength aluminum alloy clad material for heat exchangers exhibiting excellent corrosion resistance. In particular, the present invention relates to a high-strength aluminum alloy clad material for heat exchangers exhibiting excellent corrosion resistance which is used as a constituent material for a working fluid passage of a heat exchanger joined by brazing, such as an evaporator for an automotive air conditioner or a radiator, and has particularly excellent corrosion resistance and excellent formability before brazing, and high strength after brazing.

2. Description of Background Art

Heat exchangers made of an aluminum alloy have been widely used as radiators, oil coolers, inter-coolers, heaters, and evaporators for air conditioners for automobiles, and condensers and oil coolers for hydraulic devices or industrial machines. Various types of heat exchangers made of an aluminum alloy are known. Among these, a laminated heat exchanger (drawn-cup type heat exchanger) has attracted attention because of its light weight. Such a drawn-cup type heat exchanger is fabricated by forming working fluid passages by laminating formed aluminum alloy clad materials, combining corrugated fins made of an aluminum alloy between the working fluid passages, and integrally brazing these materials.

As shown in FIGS. 1 and 2, a drawn-cup type evaporator has press-formed core plates 11 and 12 made of aluminum alloy clad materials and a corrugated fin 13 made of an aluminum alloy laminated thereon. The core plates 11 and 12 and the fin 13 are brazed by melting a brazing material in the core plates 11 and 12, thereby forming a passage 14 for a working fluid such as a refrigerant between the core plates 11 and 12.

As the core plates 11 and 12, aluminum alloy clad materials having a core material and a brazing material are used. The core material is formed of an aluminum alloy containing Mn such as an Al—Mn alloy, Al—Mn—Cu alloy, Al—Mn—Mg alloy, or Al—Mn—Cu—Mg alloy (JIS A3003 alloy, JIS A3005 alloy, etc.). The brazing material is formed of an Al—Si alloy such as an Al—Si alloy, Al—Si—Mg alloy, Al—Si—Mg—Bi alloy, Al—Si—Mg—Be alloy, Al—Si—Bi alloy, Al—Si—Be alloy, or Al—Si—Bi—Be alloy. Either one or both sides of the core material is clad with the brazing material.

An aluminum alloy containing an Al—Mn alloy to which Cu, Mg, Zn, Sn, In, and the like are added is used as the fin 13. The fin 13 and the core plates 11 and 12 are usually brazed by vacuum brazing. Moreover, flux brazing using chloride flux or fluoride flux is also used.

In recent years, reduction of the weight and manufacturing cost of heat exchangers has been strongly demanded. To deal with this demand, it is necessary to further decrease the thickness of the constituent materials of heat exchangers, such as those for a working fluid passage. However, when the strength of aluminum alloy clad materials used to form a working fluid passage is increased in order to decrease the thickness, formability is impaired due to the decreased amount of elongation. Moreover, corrosion resistance decreases, thereby causing the fabricability and durability of the heat exchangers to decrease. Therefore, development of clad materials exhibiting improved elongation (formability), strength after brazing, and corrosion resistance has been demanded.

Aluminum alloy clad materials used as the core plates 11 and 12 of the drawn-cup type evaporator 10 have a core material made of an aluminum alloy containing Mn. Therefore, these materials exhibit inferior pitting-corrosion resistance. For example, when applied to a working fluid passage for a refrigerant, perforation leakage may occur due to pitting.

Pitting-corrosion resistance of working fluid passage materials may be improved by using materials for which the potential is lower than that of the working fluid passage materials, such as an Al—M—Zn alloy, Al—M—Sn alloy, or Al—M—In alloy as the fin 13. The sacrificial anode effect of the fin 13 made of these materials provides the working fluid passage materials with corrosion resistance. However, occurrence of pitting-corrosion in the working fluid passage material can be prevented only in the area near the fin 13. Occurrence of pitting-corrosion in the working fluid passage material is inevitable in the area apart from the fin 13 because the sacrificial anode effect of the fin 13 is not obtained.

The following materials are proposed as aluminum alloy clad materials for working fluid passages exhibiting improved corrosion resistance: (1) a clad material in which Cu, Ti, Cr, or Zr is added to the core material thereof (Japanese Patent Publication 41621/1994, Japanese Patent Application Laid-open No. 241133/1988, Japanese Patent Application Laid-open No. 83396/1989, and Japanese Patent Application Laid-open No. 258945/1990); (2) a clad material in which the content of Fe, which forms a compound functioning as a cathode and decreases corrosion resistance in the core material, is limited to 0.2% or less (Japanese Patent Application Laid-open No.83396/1989); and (3) a clad material exhibiting improved intergranular corrosion resistance in which the Fe content and the Si content in the core material are limited (Japanese Patent Publication 41621/1994 and Japanese Patent Application Laid-open No. 241133/1988). Although these aluminum alloy clad materials exhibit improved corrosion resistance, these materials cannot fully satisfy the demand for improved formability and strength after brazing.

In order to obtain an aluminum alloy clad material which can solve the above problems in conventional working fluid passage materials and satisfy the demand for reduced thickness, the present inventors have conducted extensive experiments and studies on the composition of the core material, the composition of the brazing material used to clad both sides of the core material, and the effects of the combination of these materials on formability, strength after brazing, brazability, and corrosion resistance. Accordingly, an object of the present invention is to provide a high-strength aluminum alloy clad material for heat exchangers which has excellent corrosion resistance and superior formability before brazing, is easily brazed, and has improved strength after brazing.

SUMMARY OF THE INVENTION

In order to achieve the above object, the present invention provides the following high-strength aluminum alloy clad materials for heat exchangers exhibiting excellent corrosion resistance.

(1) A high-strength aluminum alloy clad material for heat exchangers exhibiting excellent corrosion resistance comprising a core material and a brazing material, with either one or both sides of the core material clad with the brazing material, wherein the core material comprises an aluminum alloy comprising from 0.3% to less than 0.6% of Mn, from more than 0.6% to 1.0% of Cu, less than 0.1% of Si, 0.3% or less of Fe, and from 0.06% to 0.35% of Ti, with the remainder consisting of Al and impurities; and the brazing material used to clad either one or both sides of the core material comprises an Al—Si aluminum alloy in which the Ca content is limited to 0.006% or less.

(2) A high-strength aluminum alloy clad material for heat exchangers exhibiting excellent corrosion resistance comprising a core material and a brazing material, with either one or both sides of the core material clad with the brazing material, wherein the core material comprises an aluminum alloy comprising from 0.3% to less than 0.6% of Mn, from more than 0.7% to 1.0% of Cu, less than 0.1% of Si, 0.3% or less of Fe, and from 0.06% to 0.35% of Ti, with the remainder consisting of Al and impurities; and the brazing material used to clad either one or both sides of the core material comprises an Al—Si aluminum alloy in which the Ca content is limited to 0.006% or less.

(3) A high-strength aluminum alloy clad material for heat exchangers exhibiting excellent corrosion resistance comprising a core material and a brazing material, with either one or both sides of the core material clad with the brazing material, wherein the core material comprises an aluminum alloy comprising from 0.3% to less than 0.6% of Mn, from more than 0.6% to 1.0% of Cu, less than 0.1% of Si, 0.3% or less of Fe, from 0.06% to 0.35% of Ti, and from 0.06% to 0.7% of Mg, with the remainder consisting of Al and impurities; and the brazing material used to clad either one or both sides of the core material comprises an Al—Si aluminum alloy in which the Ca content is limited to 0.006% or less.

(4) The high-strength aluminum alloy clad material for heat exchangers exhibiting excellent corrosion resistance according to the above (3), wherein the Cu content in the core material is from more than 0.7% to 1.0% or less.

(5) The high-strength aluminum alloy clad material for heat exchangers exhibiting excellent corrosion resistance according to the above (3), wherein the Mg content in the core material is from 0.06% to 0.5%. (6) The high-strength aluminum alloy clad material for heat exchangers exhibiting excellent corrosion resistance according to the above (4), wherein the Mg content in the core material is from 0.06% to 0.5%.

DETAILED DESCRIPTION OF THE INVENTION AND PREFERRED EMBODIMENT

Figure 1:
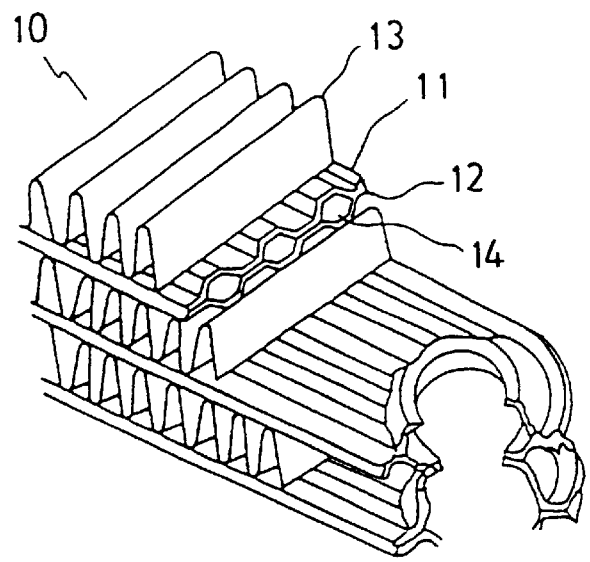
FIG. 1 is a perspective view showing a drawn-cup type evaporator to which a high-strength aluminum alloy clad material for heat exchangers according to an embodiment of the present invention can be applied.

The effects and reasons for limitations of alloy components added to a high-strength aluminum alloy clad material for heat exchangers exhibiting excellent corrosion resistance of the present invention will be described below.

(1) Components of core material

Mn in the core material improves the strength of the core material and increases the potential of the core material. As a result, the potential difference between the core material and a sacrificial anode layer becomes greater, thereby improving corrosion resistance. The Mn content is preferably from 0.3% to less than 0.6%. If the content is less than 0.3%, the effect is insufficient. If the content is 0.6% or more, formability decreases due to the small amount of elongation, thereby resulting in inferior corrosion resistance of the core material. The Mn content is still more preferably from more than 0.5% to less than 0.6%.

Cu in the core material improves the strength of the core material and increases the potential of the core material. As a result, the potential difference between the core material and the sacrificial anode layer becomes greater, thereby improving corrosion resistance. The Cu content is preferably from more than 0.6% to 1.0%. If the content is 0.6% or less, the effect is insufficient. If the content is more than 1.0%, formability decreases due to the small amount of elongation and the core material may be melted during brazing. Moreover, corrosion resistance of the core material decreases. The Cu content is still more preferably from more than 0.7% to 1.0%.

Si and Fe present in the core material as impurities form compound which functions as a cathode, thereby decreasing corrosion resistance. Therefore, the Si content and the Fe content are preferably less than 0.1% and 0.3% or less, respectively. Since high-purity aluminum metals containing small amounts of Si and Fe are expensive, the Si content and the Fe content are still more preferably from 0.01% to less than 0.1% and from 0.01% to 0.3%, respectively.

Ti in the core material further improves corrosion resistance of the core material. Ti in the core material is solidified separately in high-concentration areas and in low-concentration areas. These areas are distributed alternately in layers when the material is rolled in the direction of the plate thickness. The low-concentration area preferentially corroded rather than the high-concentration area, thereby causing corroded layers to be formed. This prevents corrosion from proceeding in the direction of the plate thickness, thereby improving pitting-corrosion resistance of the core material. The Ti content is preferably from 0.06 to 0.35%. If the content is less than 0.06%, the effect is insufficient. If the content exceeds 0.35%, giant compounds are produced at the time of casting, thereby impairing rolling workability. The Ti content is still more preferably 0.1–0.35%.

Mg in the core material improves the strength of the core material. The Mg content is preferably from 0.06 to 0.7%. If the content is less than 0.06%, the effect is insufficient. If the content exceeds 0.7%, formability decreases due to the small amount of elongation, and the core material maybe melted during brazing. Moreover, corrosion resistance of the core material decreases. The Mg content is still more preferably from 0.06 to 0.5%.

Other components such as Zn, Cr, and Zr may be present in the core material in the range within which the effect of the present invention is not adversely affected. Note that the Zn content must be 0.2% or less because Zn decreases the potential of the core material, thereby impairing corrosion resistance due to the decreased potential difference between the core material and the sacrificial anode layer.

(2) Components of brazing material

Different types of brazing materials are used depending on the brazing method. Specifically, an Al—Si—Mg alloy, Al—Si—Mg—Bi alloy, or the like is used for vacuum brazing. An Al—Si alloy is used for flux brazing.

Ca in the brazing material, which forms closely packed oxides on the surface of the brazing material, decreases wettability and spreadability of the brazing material, thereby impairing brazability. The Ca content is preferably 0.006% or less. If the content exceeds 0.006%, brazability significantly decreases. The Ca content is still more preferably 0.004% or less.

At least one of 0.1% or less of Be, Sr, Li, or Na may be added to the brazing material to improve brazability. A small amount of elements such as Mn, Cu, Ti, Cr, Zr, and Ni may be added to the brazing material to improve the strength of the brazing material in the range within which the effect of the present invention is not adversely affected. Note that the total content of these elements is preferably 1% or less because a large amount of these elements decreases the self-corrosion resistance of the brazing material. Furthermore, the effect of the present invention is not impaired even if the brazing material contains Zn, In, Sn, or the like.

The high-strength aluminum alloy clad material for heat exchangers exhibiting excellent corrosion resistance of the present invention (hereinafter called "aluminum alloy clad material") is manufactured as follows. Aluminum alloys which form the core material and the brazing material are cast by continuous casting, for example. The materials are homogenized or hot-rolled after homogenization to a predetermined thickness. The materials are assembled and hot-rolled using a conventional method to form a clad material. The clad material is cold-rolled to a predetermined thickness and subjected to final annealing.

Figure 2:
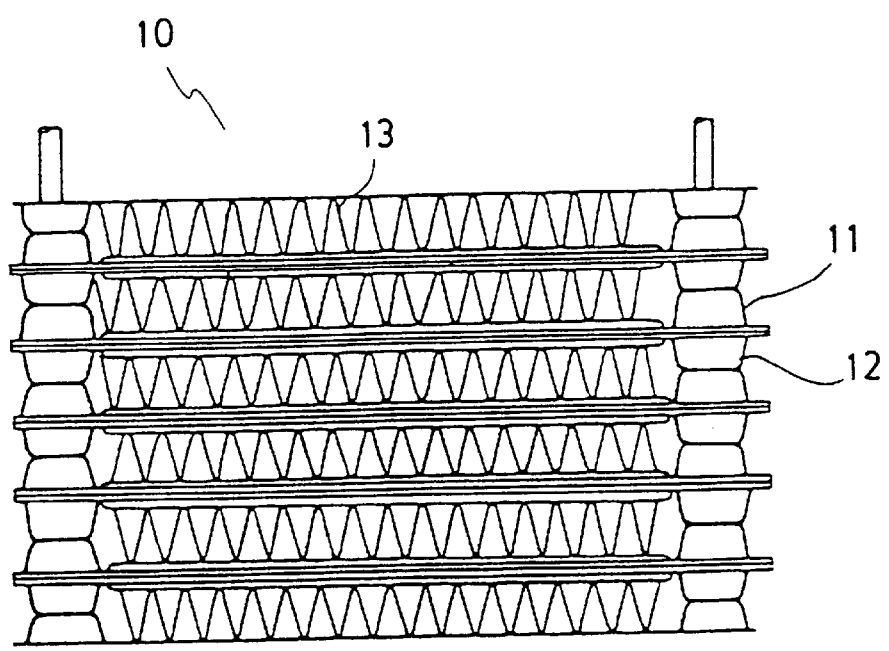
FIG. 2 is a front view showing the drawn-cup type evaporator shown in FIG. 1.

When using the aluminum alloy clad material of the present invention to form constituent members of a drawn-cup type evaporator, for example, the aluminum alloy clad material is press-formed to obtain core plates 11 and 12 shown in FIGS. 1 and 2. The core plates 11 and 12 are laminated, and a Fin 13 made of an aluminum alloy is brazed onto the outer surfaces of the core plates 11 and 12 to obtain a drawn-cup type evaporator When forming a tank material such as a radiator or a evaporator, the aluminum alloy clad material is press-formed in the shape of a tank brazed. It is preferable to braze the above materials in an inert gas atmosphere using fluoride flux or under vacuum.

EXAMPLES

Example 1

Aluminum alloys for core materials having compositions shown in Table 1 (compositions of core materials Nos. 1–9), and aluminum alloys for brazing materials having compositions shown in Table 2 (compositions of brazing materials A and B) were cast by continuous casting. The aluminum alloys for core materials were homogenized and scalped to a thickness of 21 mm to obtain core materials. The aluminum alloys for the brazing material were scalped and hot-rolled to a thickness of 4.5 mm to obtain brazing materials. The brazing materials were laminated on both sides of the core materials. The materials were hot-rolled to obtain aluminum alloy clad materials with a thickness of 3 mm. The aluminum alloy clad materials were then cold-rolled and provided with final annealing to obtain soft plates (tempering 0) of the aluminum alloy clad materials with a thickness 0.5 mm (clad materials Nos. 1–9).

TABLE 1

| | Core material No. | Composition (wt %) | | | | | | |
|---|---|---|---|---|---|---|---|---|
| | | Cu | Mn | Si | Fe | Ti | Mg | Al |
| Example | 1 | 0.65 | 0.59 | 0.05 | 0.1 | 0.1 | — | Remainder |
| | 2 | 0.81 | 0.55 | 0.05 | 0.15 | 0.2 | — | Remainder |
| | 3 | 1.0 | 0.3 | 0.09 | 0.2 | 0.25 | — | Remainder |
| | 4 | 0.65 | 0.59 | 0.05 | 0.1 | 0.1 | 0.5 | Remainder |
| | 5 | 0.75 | 0.55 | 0.07 | 0.15 | 0.2 | 0.2 | Remainder |
| | 6 | 0.81 | 0.59 | 0.05 | 0.1 | 0.25 | 0.3 | Remainder |
| | 7 | 0.85 | 0.51 | 0.09 | 0.2 | 0.16 | 0.2 | Remainder |
| | 8 | 1.0 | 0.30 | 0.05 | 0.1 | 0.25 | 0.1 | Remainder |
| | 9 | 0.65 | 0.52 | 0.07 | 0.12 | 0.2 | 0.1 | Remainder |
| Comparative Example | 10 | 0.4 | 0.52 | 0.07 | 0.15 | 0.15 | — | Remainder |
| | 11 | 1.2 | 0.52 | 0.07 | 0.15 | 0.15 | 0.1 | Remainder |
| | 12 | 1.0 | 0.25 | 0.09 | 0.3 | 0.40 | — | Remainder |
| | 13 | 0.81 | 1.2 | 0.09 | 0.3 | 0.03 | 0.2 | Remainder |
| | 14 | 0.81 | 0.59 | 0.2 | 0.35 | 0.15 | — | Remainder |
| | 15 | 0.81 | 0.52 | 0.09 | 0.2 | 0.2 | 0.8 | Remainder |
| | 16 | 0.15 | 1.2 | 0.2 | 0.5 | 0.01 | — | Remainder |
| | 17 | — | 1.2 | 0.2 | 0.5 | 0.01 | 0.5 | Remainder |

TABLE 2

| | Brazing material No. | Composition (wt %) | | | |
|---|---|---|---|---|---|
| | | Si | Mg | Ca | Al |
| Example | A | 10 | 1.5 | 0.003 | Remainder |
| | B | 10 | — | 0.005 | Remainder |
| Comparative Example | C | 10 | 1.5 | 0.007 | Remainder |
| | D | 10 | — | 0.008 | Remainder |

(1) Formability, (2) strength after brazing, (3) corrosion resistance, and (4) brazability of the aluminum alloy clad materials thus obtained (clad materials Nos. 1–9) were evaluated according to the following methods.

(1) Formability

The aluminum alloy clad materials were subjected to a tensile test to measure the elongation rate (%). Formability of an aluminum alloy clad material with an elongation rate of 20% or less was evaluated as "Bad". Specifically, in the press forming of core plate materials for a drawn-cup type evaporator, cracks tend to occur when the elongation rate of the materials is 20% or less.

(2) Strength after brazing

The aluminum alloy clad materials were heated under the same conditions as in the brazing, were cooled, and were subjected to a tensile test. Specifically, the aluminum alloy clad materials were heated at 600° C. (material temperature) for 3 minutes under vacuum ($5 \times 10^{-5}$ Torr or less) in a vacuum brazing (VB) method. In a fluoride flux brazing (NB) method, the aluminum alloy clad materials to which fluoride flux (concentration: 3%) was applied were heated at 600° C. (material temperature) for 3 minutes in nitrogen gas. Each material was then subjected to a tensile test to measure the tensile strength (MPa).

(3) Corrosion resistance

The aluminum alloy clad materials obtained using the VB method and the NB method were subjected to the CASS test for one month according to JIS H8681 to measure the maximum corrosion depth (mm) of the aluminum alloy clad materials.

(4) Brazability

Figure 3:
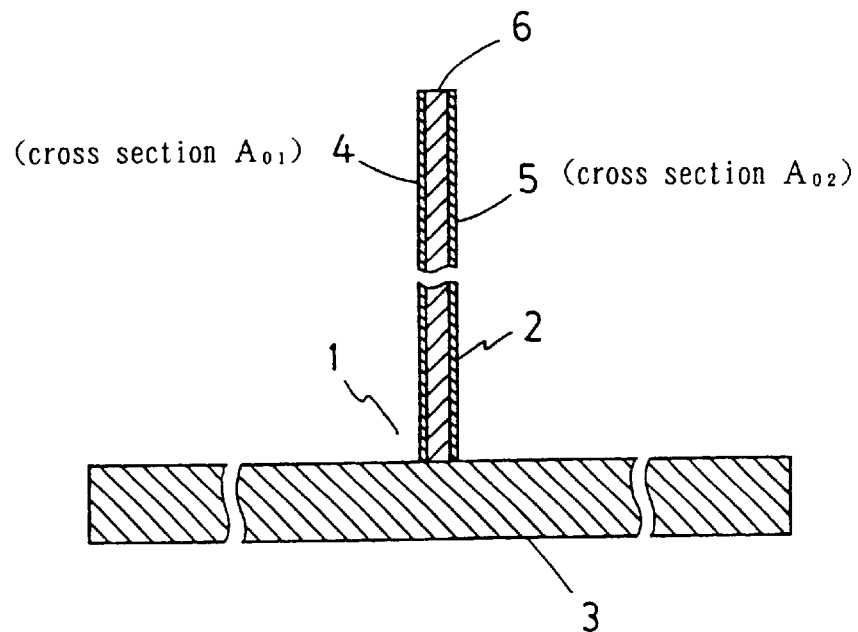
FIG. 3 is a cross section showing the test conditions (before heating for brazing) for demonstrating brazability of a high-strength aluminum alloy clad material for heat exchangers according to an embodiment of the present invention.
Figure 4:
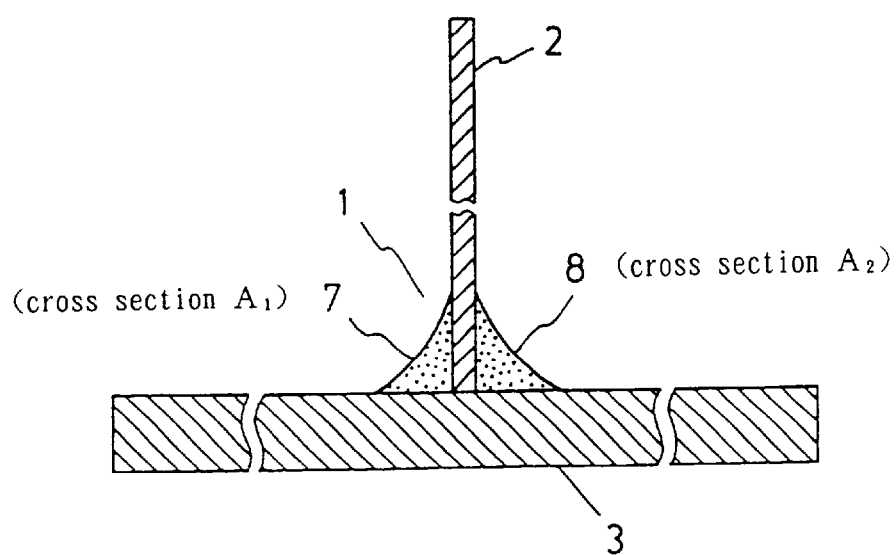
FIG. 4 is a cross section showing the test conditions (after heating for brazing) for demonstrating brazability of a high-strength aluminum alloy clad material for heat exchangers according to an embodiment of the present invention.

As shown in FIG. 3, an aluminum alloy clad material 2, in which both sides of a core material 6 were clad with brazing materials 4 and 5, with a width 20 mm and a length 40 mm was placed on a 3003 alloy material 3 (width: 20 mm, length: 40 mm, thickness: 1 mm) to prepare a joint 1 with a reverse T shape. The joint 1 was heated using either the VB method or the NB method in the same manner as in the above methods. Fillets 7 and 8 were formed at the corners of the joint 1 after brazing as shown in FIG. 4. A flow factor K $((A_1+A_2)/(A_{01}+A_{02}))$ was calculated from the cross sections $A_1$ and $A_2$ of the fillets 7 and 8 and the cross sections $A_{01}$ and $A_{02}$ of the brazing material 4 and 5 before brazing. The greater the flow factor K, the greater the ratio of the melted brazing material, thereby indicating excellent brazability due to good flowability of the braze. Brazability was evaluated as "Good" when the flow factor K was 0.5 or more, and as "Bad" when the flow factor K was less than 0.5.

The evaluation results are shown in Table 3. As is clear from Table 3, the clad materials Nos. 1–9 in Examples which satisfied the conditions of the present invention had an elongation rate as large as 23% or more, indicating good formability. These materials exhibited excellent strength of 135 MPa or more after brazing. The maximum corrosion depth of these materials after the CASS test was 0.18–0.20 mm, indicating good corrosion resistance. These materials had a flow factor of 0.5 or more. In addition, these materials exhibited good productivity without causing problems in production.

Comparative Example 1

Aluminum alloys for core materials having compositions shown in Table 1 (compositions of core materials Nos. 10–17), and aluminum alloys for brazing materials (compositions of brazing materials C and D) were cast by continuous casting to obtain soft plates (tempering 0) of aluminum alloy clad materials (clad materials Nos. 10–17) with a thickness of 0.5 mm in the same manner as in Example 1.

(1) Formability, (2) strength after brazing, (3) corrosion resistance, and (4) brazability of the aluminum alloy clad materials thus obtained (clad materials Nos. 10–17) were evaluated according to the same methods as in the above example. The results are shown in Table 3.

As is clear from Table 3, the clad materials Nos. 10–17, which did not satisfy the conditions of the present invention did not exhibit the performance required for the aluminum alloy clad material for heat exchangers. The clad material No. 10 had a low tensile strength due to the small Cu content. The clad material No. 11 showed a small amount of elongation and exhibited inferior formability due to the large Cu content. Moreover, local melting occurred during heating for brazing. The clad material No. 12 could not be rolled due to the large Ti content. The clad material No. 13 exhibited a small amount of elongation and inferior formability due to the large Mn content. Moreover, the maximum corrosion depth of the clad material No. 13 was large due to the small Ti content, indicating an inferior corrosion resistance. Furthermore, formation of fillets was inadequate due to the large Ca content in the brazing material, thereby resulting in an inferior brazability.

Perforation pitting occurred in the clad material No. 14 in the CASS test due to the large Si and Fe contents. Moreover, formation of fillets was inadequate due to the large Ca content in the brazing material, thereby resulting in inferior brazability. The clad material No. 15 had a small amount of elongation and exhibited inferior formability due to the large Mg content. Moreover, local melting occurred during heating for brazing.

The clad material No. 16 corresponding to the JIS 3003 alloy had a low tensile strength due to the small Cu content. The clad material No. 16 exhibited inferior corrosion resistance due to the small Ti content and large Fe content, resulting in perforation pitting in the CASS test. Furthermore, formation of fillets was inadequate due to the large Ca content in the brazing material, thereby resulting in inferior brazability. The clad material No 17 corresponding to the JIS 3005 alloy exhibited inferior corrosion resistance due to the small Ti content and large Si and Fe contents, resulting in the occurrence of perforation pitting in the CASS test. Moreover, formation of fillets was inadequate due to the large Ca content in the brazing material, thereby resulting in inferior brazability.

As described above, the present invention can provide a high-strength aluminum alloy clad material for heat

TABLE 3

| Clad material No. | | Core material No. | Brazing material No. (Brazing method) | Elongation rate of raw material (%) | Tensile strength after brazing (MPa) | Maximum corrosion depth after CASS test (mm) | Brazability | Productivity of raw material |
|---|---|---|---|---|---|---|---|---|
| Example | 1 | 1 | B(NB) | 30 | 135 | 0.20 | Good | Good |
| | 2 | 2 | B(NB) | 28 | 140 | 0.18 | Good | Good |
| | 3 | 3 | B(NB) | 26 | 144 | 0.20 | Good | Good |
| | 4 | 4 | A(VB) | 23 | 183 | 0.20 | Good | Good |
| | 5 | 5 | A(VB) | 25 | 158 | 0.18 | Good | Good |
| | 6 | 6 | A(VB) | 24 | 173 | 0.18 | Good | Good |
| | 7 | 7 | A(VB) | 24 | 164 | 0.18 | Good | Good |
| | 8 | 8 | B(NB) | 25 | 152 | 0.20 | Good | Good |
| | 9 | 9 | A(VA) | 26 | 140 | 0.18 | Good | Good |
| Comp. Example | 10 | 10 | B(NB) | 30 | 109 | 0.22 | Good | Good |
| | 11 | 11 | A(VB) | 19 | — | — | melted | Good |
| | 12 | 12 | A(VB( | — | — | — | — | Difficult |
| | 13 | 13 | C(VB) | 18 | 179 | 0.35 | Bad | Good |
| | 14 | 14 | D(NB) | 28 | 140 | Perforation pitting | Bad | Good |
| | 15 | 15 | A(VB) | 17 | — | — | melted | Good |
| | 16 | 16 | D(NB) | 30 | 115 | Perforation pitting | Bad | Good |
| | 17 | 17 | C(VB) | 23 | 160 | Perforation pitting | Bad | Good | exchangers which particularly excels in corrosion resistance and formability before brazing, and has improved strength after brazing. According to the high-strength aluminum alloy clad material for heat exchangers of the present invention, the thickness of the working fluid passage materials can be reduced, thereby reducing the weight of the heat exchangers such as radiators and evaporators and increasing the period of time of use.

Obviously, numerous modifications and variations of the present invention are possible in light of the above teachings. It is therefore to be understood that, within the scope of the appended claims, the invention may be practiced other than as specifically described herein.

What is claimed is:

1. A high-strength aluminum alloy clad material for heat exchangers exhibiting excellent corrosion resistance comprising a core material and a brazing material, with both sides of the core material clad with the brazing material, wherein the core material comprises an aluminum alloy comprising from 0.3% to less than 0.6% of Mn, from more than 0.6% to 1.0% of Cu, less than 0.1% of Si, 0.3% or less of Fe, and from 0.06% to 0.35% of Ti, with the remainder consisting of Al and impurities; and the brazing material used to clad the core material comprises an Al—Si aluminum alloy in which the Ca content is limited to 0.006% or less.

2. A high-strength aluminum alloy clad material for heat exchangers exhibiting excellent corrosion resistance comprising a core material and a brazing material, with both sides of the core material clad with the brazing material, wherein the core material comprises an aluminum alloy comprising from 0.3% to less than 0.6% of Mn, from more than 0.7% to 1.0% of Cu, less than 0.1% of Si, 0.3% or less of Fe, and from 0.06% to 0.35% of Ti, with the remainder consisting of Al and impurities; and the brazing material used to clad the core material comprises an Al—Si aluminum alloy in which the Ca content is limited to 0.006% or less.

3. A high-strength aluminum alloy clad material for heat exchangers exhibiting excellent corrosion resistance comprising a core material and a brazing material, with both sides of the core material clad with the brazing material, wherein the core material comprises an aluminum alloy comprising from 0.3% to less than 0.6% of Mn, from more than 0.6% to 1.0% of Cu, less than 0.1% of Si, 0.3% or less of Fe, from 0.06% to 0.35% of Ti, and from 0.06% to 0.7% of Mg, with the remainder consisting of Al and impurities; and the brazing material used to clad either one or both sides of the core material comprises an Al—Si aluminum alloy in which the Ca content is limited to 0.006% or less.

4. The aluminum alloy clad material according to claim 3, wherein the Cu content in the core material is from more than 0.7% to 1.0% or less.

5. The aluminum alloy clad material according to claim 3, wherein the Mg content in the core material is from 0.06% to 0.5%.

6. The aluminum alloy clad material according to claim 4, wherein the Mg content in the core material is from 0.06% to 0.5%.

7. A high-strength aluminum alloy clad material according to claim 1, wherein said material contains from 0.81 to 1.0% Cu.

8. A high-strength aluminum alloy clad material according to claim 2, wherein said material contains from 0.81 to 1.0% Cu.

9. A high-strength aluminum alloy clad material according to claim 3, wherein said material contains from 0.81 to 1.0% Cu.

10. In a drawn-cup evaporator comprising a high-strength aluminum alloy clad material comprising a core material and a brazing material clad to both sides of the core material, the improvement comprising the core material comprising an aluminum alloy comprising from 0.3% to less than 0.6% Mn, from more than 0.81 to 1.0% Cu, less than 0.1% Si, no more than 0.3% Fe, and from 0.06 to 0.35% Ti, with the remainder consisting of Al and impurities and the brazing material used to clad the core material comprising an Al—Si aluminum alloy in which the Ca content is no more than 0.006%.

11. In a drawn-cup evaporator comprising a high-strength aluminum alloy clad material comprising a core material and a brazing sheet clad to both sides of the core material, the improvement comprising the core material comprising an aluminum alloy comprising from 0.3 to less than 0.6% Mn, from 0.81 to 1.0 Cu, less than 0.1% Si, no more than 0.3% Fe, from 0.06 to 0.35% Ti and from 0.06 to 0.7% Mg, with the remainder consisting of Al and impurities and the brazing material comprising an Al—Si aluminum alloy in which the calcium content is no more than 0.006% Ca.

* * * * *